Sept. 8, 1925.

W. F. MOREY 1,552,725

MOTOR VEHICLE LICENSE PLATE HOLDER

Filed Feb. 27, 1924

WITNESS

C. F. Larsh

INVENTOR
William F. Morey
BY
Bair & Freeman
ATTORNEYS

Patented Sept. 8, 1925.

1,552,725

UNITED STATES PATENT OFFICE.

WILLIAM F. MOREY, OF DES MOINES, IOWA.

MOTOR-VEHICLE LICENSE-PLATE HOLDER.

Application filed February 27, 1924. Serial No. 695,427.

*To all whom it may concern:*

Be it known that I, WILLIAM F. MOREY, a citizen of the United States, and a resident of Des Moines, in the county of Polk and State of Iowa, have invented a certain new and useful Motor-Vehicle License-Plate Holder, of which the following is a specification.

The object of my invention is to provide a license plate holder of very simple, durable and inexpensive construction.

A further object is to provide such a license plate holder made of one piece of material, which can be stamped from sheet metal at a minimum of expense and will have no joints to become loose or noisy.

A further object is to provide such a holder, which can be mounted on a Ford car particularly at the front thereof and will hold the license plate in elevated position.

Another object is to provide such a holder having parts so arranged that the license plate holder can be mounted on the central spring bracket in such a way as to hold the license plate in a well-raised position in front of the radiator, which structure, however, will not then interfere with the ordinary use of the hand crank.

Another object is to provide such a license plate holder or bracket, which will support the license plate in raised position in front of the radiator and will not interfere with the use of a curtain or cardboard on the front of the radiator.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1:
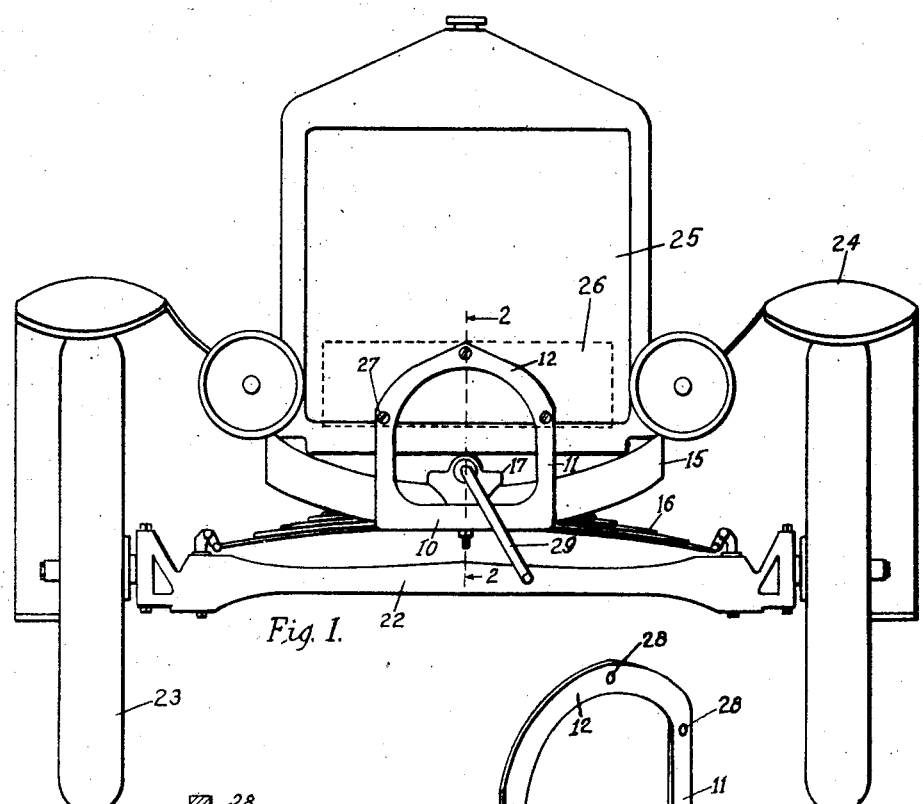
Figure 1 shows a front elevation of a Ford car equipped with a license plate holder embodying my invention.

It is well-known that the license plates, especially on the front of Ford cars are usually so low that they quickly become dirty and are difficult to read from any considerable distance away.

I have provided a license plate holder comprising an open frame having the lower horizontal member, indicated in the accompanying drawings by the reference numeral 10, the end vertical members 11, and the top member 12 curved from its central portion downwardly and toward the upper ends of the end members 11.

Figure 3:
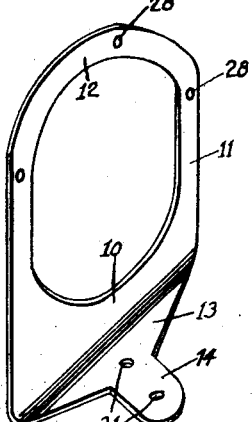
Figure 3 shows a perspective view of my improved license plate holder.

There is formed on the lower part of the member 10 integral therewith a rearwardly extending flange 13 tapered from its central portion toward its ends, as shown in Figure 3, and having a central, rearwardly extending fastening plate 14.

Figure 2:
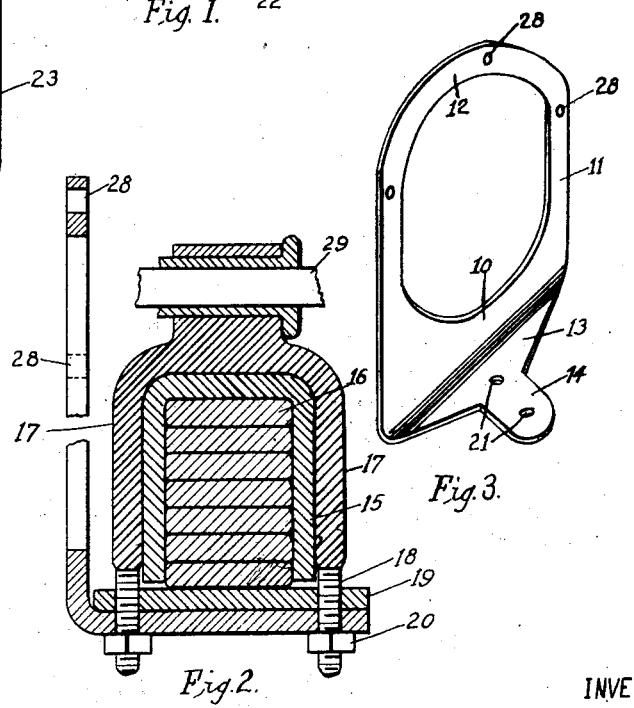
Figure 2 shows a detail, sectional view taken on the line 2—2 of Figure 1.

In the ordinary Ford car, the channel bar frame member 15 has the central portion of the front spring 16 received therein. A downward opening U-shaped bracket 17 receives the frame and spring and has screw-threaded opposite arms or ends 18 at its lower portion, as shown in Figure 2.

A holding plate 19 is mounted on the arms 18 and held in position by means of nuts 20.

Where my improved license plate bracket is used, the nuts 20 are removed. The flange 13 and plate 14 are provided with holes 21 suitably located to receive the arms 18, as shown in Figure 2.

The nuts 20 are then replaced on the arms 18 with the frame of the license plate holder or bracket extending upwardly in front of the radiator, as shown in Figure 1, in which I have shown the car having the front axle 22, the front wheels 23, front fenders 24, and the radiator 25.

It will be noted that the shape of the license plate bracket or holder is such that the license plate 26, shown in dotted lines in Figure 1, can be mounted on the upper part of the holder by means of screw bolts or the like 27, extended through holes 28 arranged at the upper center of the holder and laterally therefrom at the respective sides thereof.

The license plate is thus held in well elevated position, so that in winter it helps to protect the lower part of the radiator from direct extremely cold draft, and so that it will not be covered with mud, as it would, if it were lower.

The open frame of the holder is such that it does not in any way interfere with the ordinary use of the hand crank 29.

The flange 13 engages the plate 19 for the entire width thereof, so as to give a relative broad bearing engagement and thus prevent any looseness and rattling of the license plate bracket.

I claim as my invention:

A license plate bracket holder comprising an open vertical frame, having a central and laterally spaced bolt holes in its upper part, and a horizontal integral tapering flange at its lower edge terminating in a fastening plate, said flange and plate being provided with spaced holes.

Des Moines, Iowa, February 21, 1924.

WILLIAM F. MOREY.